US008640524B2

(12) United States Patent
Kuriyama et al.

(10) Patent No.: US 8,640,524 B2
(45) Date of Patent: Feb. 4, 2014

(54) CRASH TEST APPARATUS

(75) Inventors: Yoshitsugu Kuriyama, Ageo (JP); Isamu Kurokawa, Ageo (JP)

(73) Assignee: UD Trucks Corporation, Saitama (JP)

( * ) Notice: Subject to any disclaimer, the term of this patent is extended or adjusted under 35 U.S.C. 154(b) by 3 days.

(21) Appl. No.: 13/380,655

(22) PCT Filed: Jun. 23, 2010

(86) PCT No.: PCT/JP2010/004187
§ 371 (c)(1),
(2), (4) Date: Dec. 23, 2011

(87) PCT Pub. No.: WO2010/150544
PCT Pub. Date: Dec. 29, 2010

(65) Prior Publication Data
US 2012/0103056 A1   May 3, 2012

(30) Foreign Application Priority Data

Jun. 26, 2009   (JP) .................................. 2009-152356

(51) Int. Cl.
*G01M 7/00*   (2006.01)
(52) U.S. Cl.
USPC ........................................................ 73/12.01
(58) Field of Classification Search
USPC ........................................... 73/12.01–12.08
See application file for complete search history.

(56) References Cited

U.S. PATENT DOCUMENTS 5,635,624 A * 6/1997 Cerny ........................... 73/12.01
6,997,036 B2 * 2/2006 Kojima et al. ............... 73/12.09

FOREIGN PATENT DOCUMENTS

| JP | 02-006723 | | 1/1990 |
| JP | 5-209806 | A | 8/1993 |
| JP | 2006-023118 | A | 1/2006 |
| JP | 201169645 | * | 4/2011 |

OTHER PUBLICATIONS

International Preliminary on Patentability and Written Opinion and its English translation mailed Jan. 12, 2012. International Application No. PCT/JP2010/004187; International Filing Date: Jun. 23, 2010.
International Search Report dated Jul. 27, 2010. International Application No. PCT/JP2010/004187; International Filing Date: Jun. 23, 2010.

* cited by examiner

*Primary Examiner* — Lisa Caputo
*Assistant Examiner* — Octavia Davis-Hollington
(74) *Attorney, Agent, or Firm* — Antonelli, Terry, Stout & Kraus, LLP.

(57) ABSTRACT

A crash test apparatus for truck cabs includes a fixture frame mounting a cab, a cart mounting the fixture frame, a protruding barrier disposed in front of the cab, and a crash device moving the cart to make the cab crash against the protruding barrier. The crash test apparatus includes a frame deformation amount reproduction mechanism disposed between a front of the cart and the protruding barrier, and when the crash device operates, deforming by a deformation amount of a frame of a vehicle on which the cab is mounted, to make the cab crash against the protruding barrier.

7 Claims, 8 Drawing Sheets

CRASH TEST APPARATUS

CROSS REFERENCE TO RELATED APPLICATION

This application is a U.S. National Stage application under 35 U.S.C. §371 claiming the benefit of prior filed International Application Number PCT/JP2010/004187, filed Jun. 23, 2010, in which the International Application claims a priority date of Jun. 26, 2009 based on prior filed Japanese Patent Application Number 2009-152356, the entire contents of which are incorporated herein by reference.

TECHNICAL FIELD

The present invention relates to a crash test apparatus conducting a crash test of a cab of a truck.

BACKGROUND ART

As presented in Patent Document 1 or FIG. 12, a conventional crash test of a truck 1 is conducted by crashing a front surface of the truck 1 to a crash barrier 9 in a finished real car state including a cab 3, a frame 5, and a load-carrying platform 7.

Patent Document 1: Japanese Unexamined Patent Application Publication No. H05-209806

DISCLOSURE

Problems to be Solved

In the crash test of a truck, the confirmation of cab strength, the verification and confirmation of airbag sensor sensitivity, the confirmation of a crew damage value, and the like are necessary, but crash speed differs depending on each item to be confirmed.

Accordingly, each crash test needs a vehicle, which has given rise to problems such as an increase in development expense and the elongation of an evaluation period.

However, from the observation of phenomena in a real vehicle crash test of a cab-over truck with a frame, it has been known that the frame and the cab exhibit independent behaviors, and in the development of an airbag, the verification and confirmation of the airbag sensor sensitivity, and the confirmation of the crew damage value, the development is possible if the independent behavior of the cab is known.

Therefore, by establishing a bench test method for only a cab not using a real vehicle, it is possible to evaluate a vehicle body deformation amount and transmission of acceleration transmitted to a vehicle body which were not conventionally possible to evaluate, and further the evaluation of displacement amounts of a steering wheel and a steering column, and so on are also possible, which makes it possible to reduce development expense owing to a reduction in the number of crashed real vehicles and shorten a development evaluation period.

The present invention was devised in consideration of such circumstances, and has a proposition to provide a crash test apparatus for truck cabs establishing a bench test method for only a cab without using a real vehicle.

Means for Solving the Problems

To attain the above proposition, the present invention includes a fixture frame including a front support device supporting a front part of a cab so as to allow the front part to move in a front and a rear direction and a rear support device fixing and supporting a rear part of the cab, a cart mounting the fixture frame, a protruding barrier disposed in front of the cab, a crash device moving the cart to make the cab crash against the protruding barrier, and a real vehicle frame deformation amount reproduction mechanism disposed between a front of the cart and the protruding barrier, and when the crash device operates to make the cab crash against the protruding barrier, the mechanism reproducing a crash deformation amount of a frame of a real vehicle on which the cab is mounted.

Effects

According to the present invention, a frame deformation amount reproduction mechanism reproduces an amount corresponding to the deformation amount of the real vehicle. When the cab is crashed against the protruding barrier, the cab deforms while the front support device supporting the front part of the cab is moving backward, which makes it possible to reproduce a crash similar to that of the real vehicle.

As a result, it enables the easy and sure evaluation such as generated acceleration, cab deformation, the confirmation of cab strength, the verification and confirmation of airbag sensor sensitivity, the confirmation of a crew damage value, and the like only with the cab without conducting a crash test using a real vehicle, and consequently, it is possible to reduce development expense of new-model vehicles owing to a reduction in the number of crashed real vehicles, shorten an evaluation period, and improve business efficiency.

DETAILED DESCRIPTION

Hereinafter, embodiments of the present invention will be described in detail based on the drawings.

Figure 1:
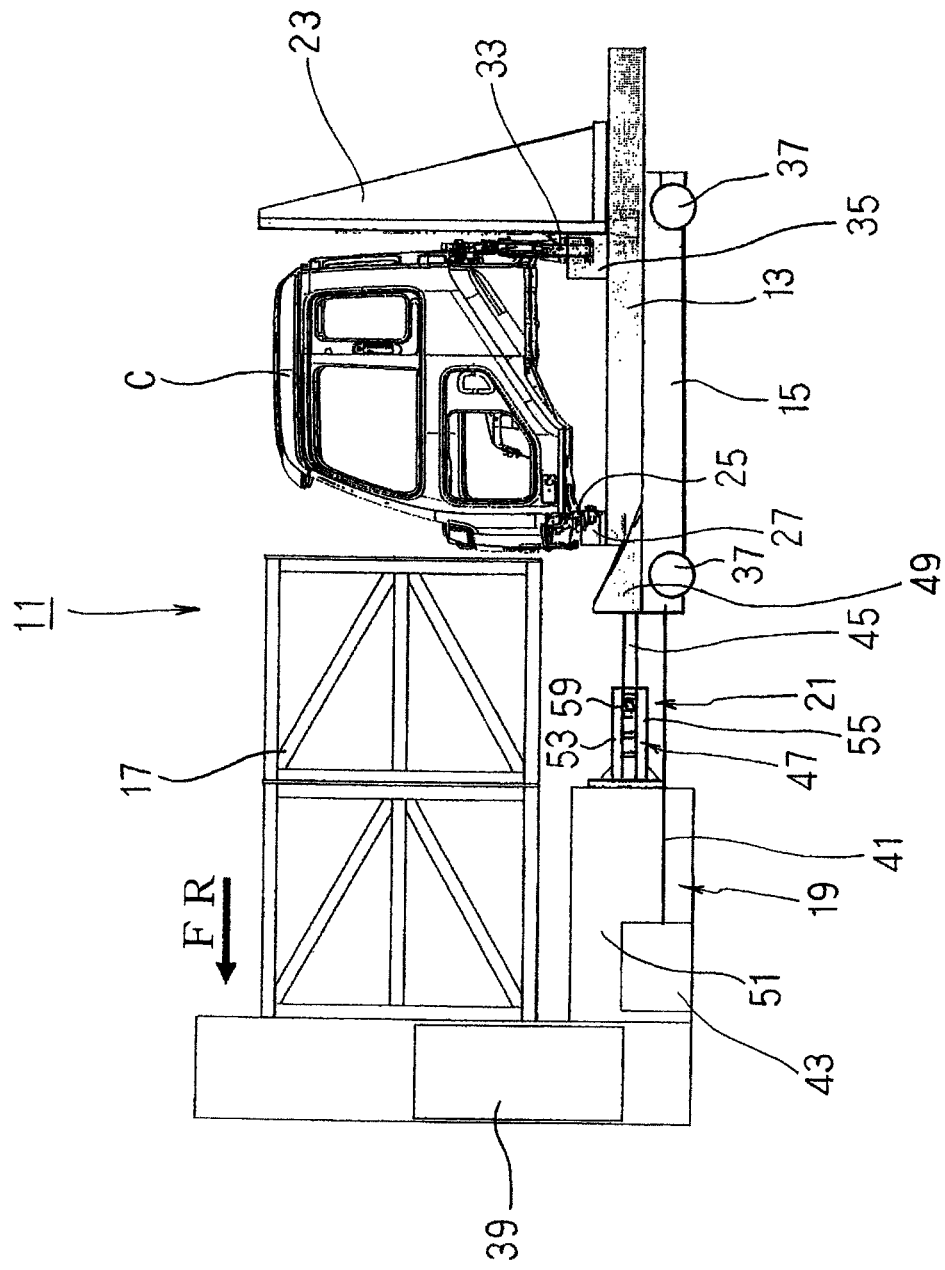
FIG. 1 is a side view of a crash test apparatus according to an embodiment of the present invention.

FIG. 1 illustrates a crash test apparatus according to an embodiment of the first aspect to the fourth aspect, and the crash test apparatus 11 has a fixture frame 13, a cart 15, a protruding barrier 17, a crash structure 19, a frame deformation amount reproduction mechanism 21, and a load-carrying platform jig 23.

Figure 2:
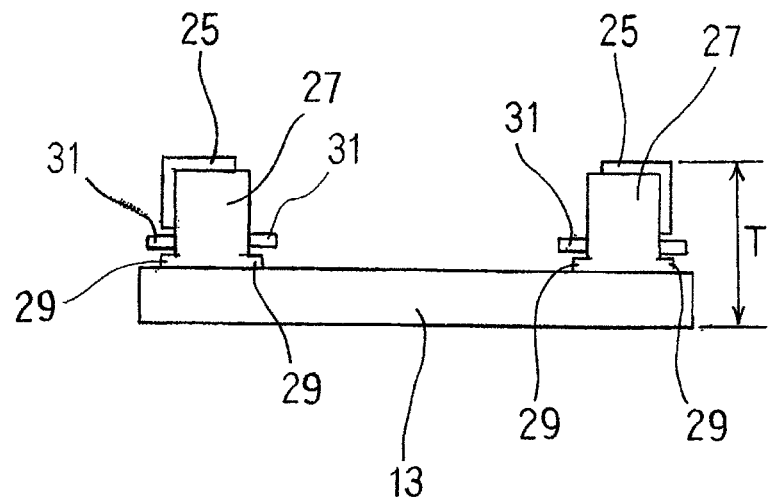
FIG. 2 is a front view of a fixture frame.
Figure 3:
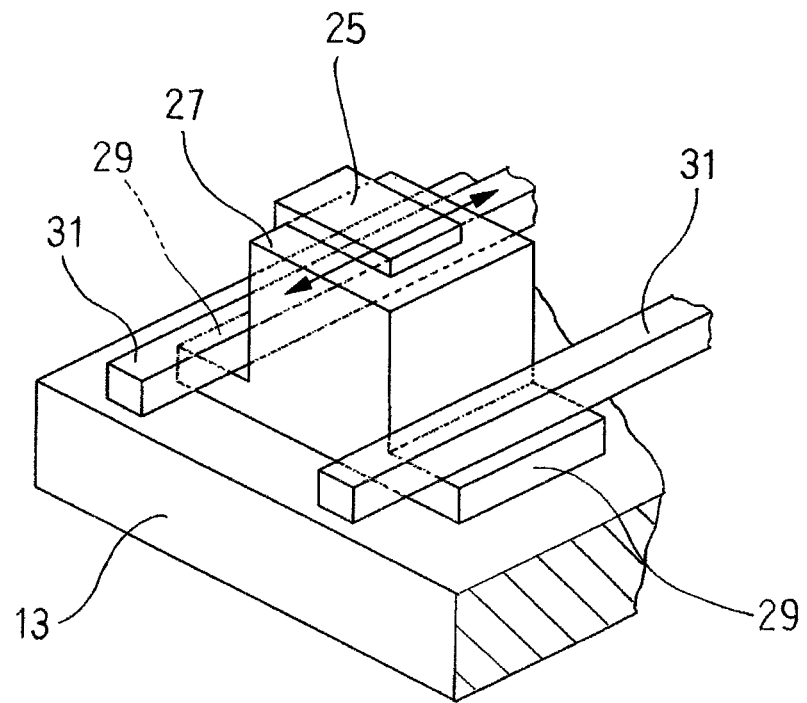
FIG. 3 is a perspective view of an attachment and a cab mounting part used to explain a slide mechanism of the attachment.

The fixture frame 13 is to mount a cab C of a truck to be tested thereon, and as illustrated in FIG. 1 to FIG. 3, on the left and right of a front upper part of the fixture frame 13, attachments (front support parts: cab mounting part bearings) 27 supporting front cab mounting parts (hereinafter, referred to as "cab mounting parts") 25 disposed on left and right front lower parts of the cab C are disposed so as to be movable in a front and rear direction of the fixture frame 13.

As illustrated in FIG. 2 and FIG. 3, the attachments 27 each are a block body having an inverted T-shaped cross section, with its laterally projecting flanges 29 being projectingly provided on its left and right lower parts, and the attachments 27 are disposed on the left and right on the fixture frame 13 so that the flanges 29 project in a left and right direction of the fixture frame 13.

On the fixture frame 13, squared timbers 31 pressing the left and right flanges 29 of each of the attachments 27 from above are provided, two for each of the attachment 27, so as to extend in the front and rear direction of the fixture frame 13. This structure enables the attachments 27 to move in the front and rear direction of the fixture frame 13 without floating up from the fixture frame 13. An up and down direction width of the fixture frame 13 and the attachment 27 (T in FIG. 2) is equal to an up and down direction width a frame of a real car.

On the left and right of a rear upper part of the fixture frame 13, attachments (rear support parts: rear cab mounting part bearings) 35 being block bodies with a rectangular cross section supporting rear cab mounting parts 33 disposed on a rear lower part of the cab C are fixed.

The fixture frame 13 is firmly fixed on the cart 15, and wheels 37 for moving the cart 15 in the front and rear direction are attached to the cart 15.

As illustrated in FIG. 1, the protruding barrier 17 is formed in a rectangular parallelepiped shape, and has a substantially equal width to a width of the cab C. The protruding barrier 17 is disposed in front of the cab C, and its front part is fixed to an existing barrier 39. Further, a lower end of the protruding barrier 17 is set so as to be higher than the attachments 25.

The crash structure 19 moves the cart 15 to make the cab C crash against the protruding barrier 17, and includes a wire 41 whose one end is fixed to the cart 15 and a driving device 43 such as a motor or an engine towing the wire 41 forward.

The frame deformation amount reproduction mechanism 21 is provided between a front part of the cart 15 and the existing barrier 39. This frame deformation reproduction mechanism 21 reproduces a frame deformation amount of a real vehicle, and is composed of a press device 45 and a support structure 47, and the press device 45 is one stay and is fixed to a bracket 49 attached to a front end of the cart 15 to be directed forward.

Figure 4:
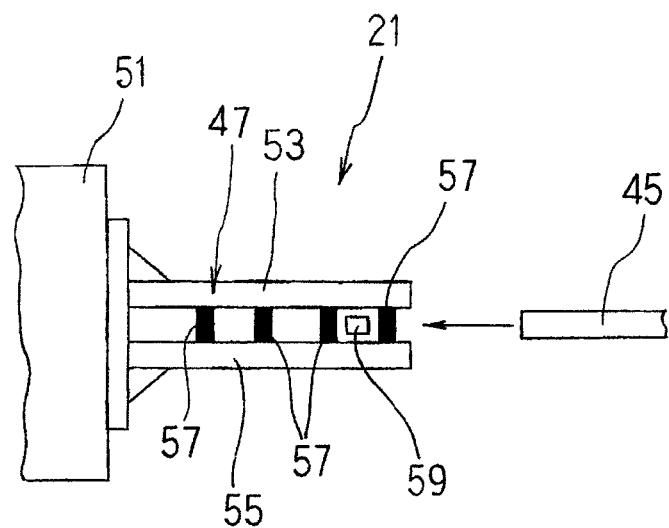
FIG. 4 is a side view of a frame deformation amount reproduction mechanism.
Figure 5:
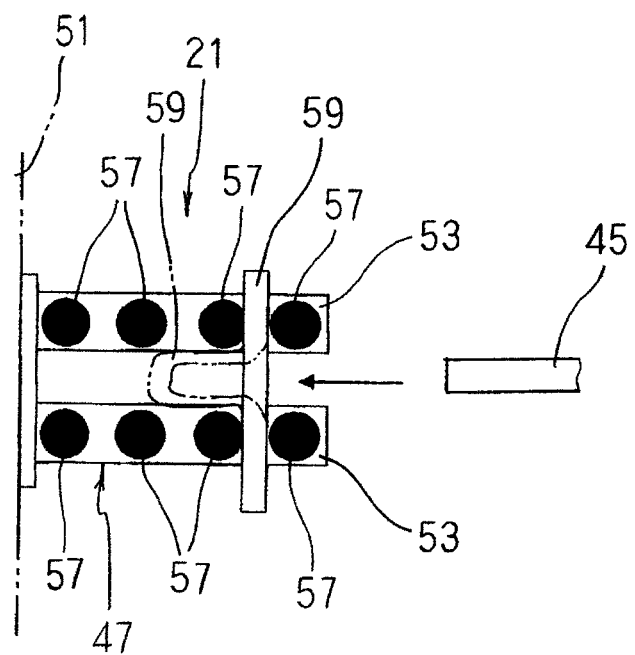
FIG. 5 is a plane view of the frame deformation amount reproduction mechanism.

The support structure 47 is mounted on a base table 51 fixed to the existing barrier 39, and as illustrated in FIG. 4 and FIG. 5, it includes pairs of left and right support devices 53, 55 disposed apart from each other in the up and down direction and a plurality of rollers 57 disposed between the both support devices 53, 55 at predetermined intervals to extend in the up and down direction. As illustrated in the drawings, a steel 59 is inserted and disposed between the left and right rollers 57 sandwiched between the upper and lower support devices 53, 55, and when the crash structure 19 operates, the press device 45 crashes against the steel 59, so that the steel 59 inserted between the left and right rollers 57 deforms as illustrated by the two-dot chain line and the cab C crashes against the protruding barrier 17.

In the deformation of the steel 59, a deformation amount of the steel 59 is a substitute for a frame deformation amount obtained in a real vehicle test, and a cross-sectional dimension of the steel 59, the number thereof, a position where to insert and dispose the steel 59 between the left and right rollers 57, and so on are decided based on a basic deformation amount map calculated from a crash speed. Then, as previously described, the cab C crashes against the protruding barrier 17 and the attachments 27 slide backward at the same time with the deformation of the steel 59, so that a crash similar to that of a real vehicle can be reproduced.

On the fixture frame 13, the load-carrying platform jig 23 is fixed at a position behind the cab C. The position of the load-carrying platform jig 23 is changeable to the same position as that of a load-carrying platform of a vehicle on which the cab C is mounted, and the load-carrying platform jig 23 has a shape corresponding to that of the load-carrying platform of the vehicle on which the cab C is mounted.

Since the crash test apparatus 11 according to this embodiment is thus structured, the cab C is mounted on the fixture frame 13, the cab mounting parts 25 of the cab C are supported on the front attachments 27, and the rear cab mounting parts 33 of the cab C are supported on the rear attachments 35, whereby the cab C is installed on the fixture frame 13.

Then, when, from this state, the crash structure 19 is operated to tow the cart 15 forward, the press device 45 of the frame deformation amount reproduction mechanism 21 crashes against the steel 59, and the steel 59 deforms by an amount corresponding to the deformation amount of the frame of the real vehicle, as illustrated in FIG. 5, so that the cab C crashes against the protruding barrier 17.

When the cab C thus crashes against the protruding barrier 17, the cab C deforms while the front attachments 27 supporting the front part of the cab C are moving backward, and the rear side of the cab C crashes against the load-carrying platform jig 23.

As described above, the crash test apparatus 11 according to this embodiment can reproduce a crash similar to that of a real vehicle in such a manner that, in the state where the cab C is mounted on the fixture frame 13, the crash structure 19 is operated to make the cab C crash against the protruding barrier 17, and can also reproduce a crash damage that the cab C receives from the load-carrying platform since the rear side of the cab C crashes against the load-carrying platform jig 23 when the cab C crashes against the protruding barrier 17.

Therefore, according to this embodiment, it is possible to evaluate generated acceleration, cab deformation, and so on only with the cab C without conducting a crash test using a real vehicle, and also the confirmation of cab strength, the verification and confirmation of airbag sensor sensitivity, and the confirmation of the crew damage value are possible, which as a result enables the easy and sure evaluation of the cab C, and accordingly it is possible to reduce development expense of new-model vehicles owing to a reduction in the number of crashed real vehicles, shorten the evaluation period, and improve business efficiency.

Figure 6:
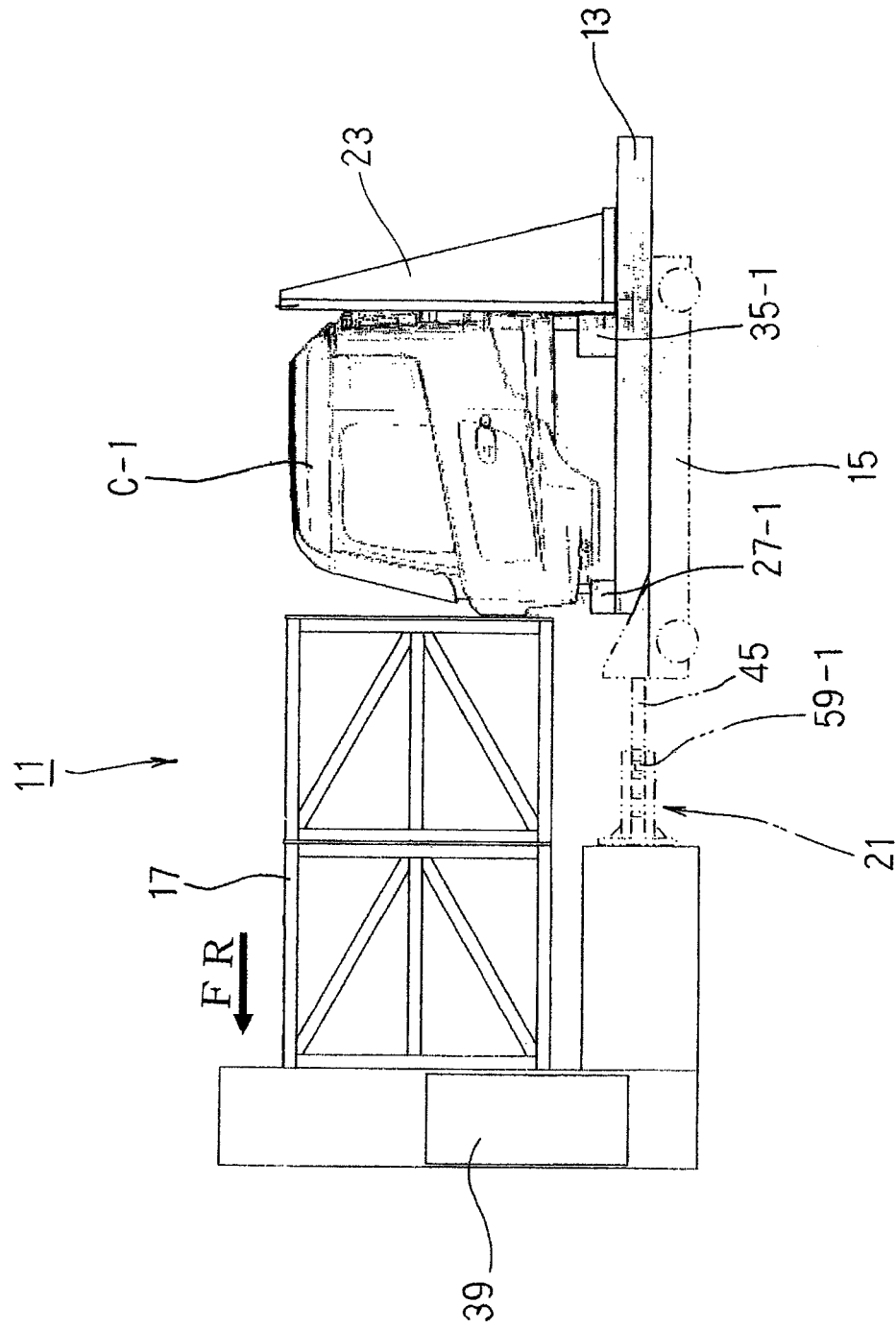
FIG. 6 is an explanatory view illustrating a state where a cab with a different size is mounted on the crash test apparatus in FIG. 1.

FIG. 6 illustrates a state where a cab C-1 with a different size is mounted on the crash test apparatus 11. In FIG. 1, the medium-sized cab C is mounted on the crash test apparatus 11, and in FIG. 6, the large-sized cab C-1 is mounted on the crash test apparatus 11. In this case, it is possible to cope with cabs with various sizes by changing the attachments 27, 35 to use attachments 27-1, 35-1 compatible with the cab C-1. Further, when a frame of a vehicle on which the cab is mounted is different, a steel 59-1 compatible with this frame is used.

Figure 7:
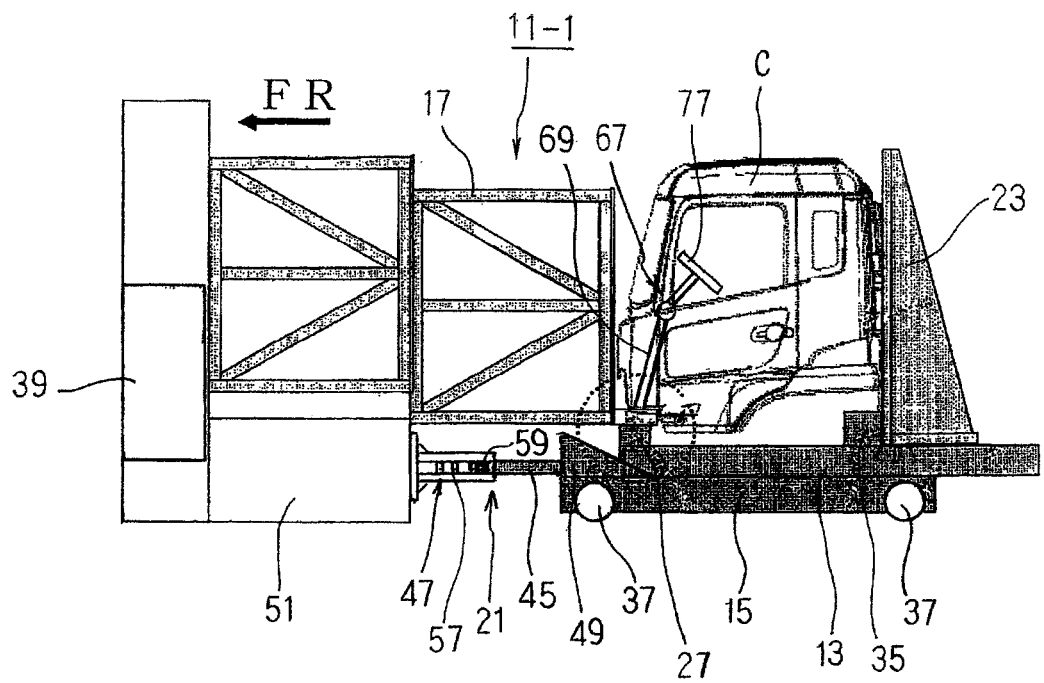
FIG. 7 is a side view of a crash test apparatus according to another embodiment of the present invention.
Figure 8:
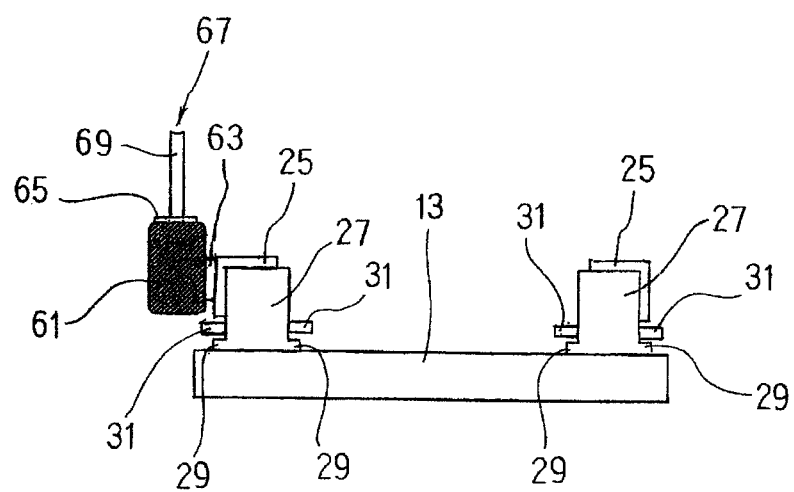
FIG. 8 is a front view of a fixture frame.
Figure 9:
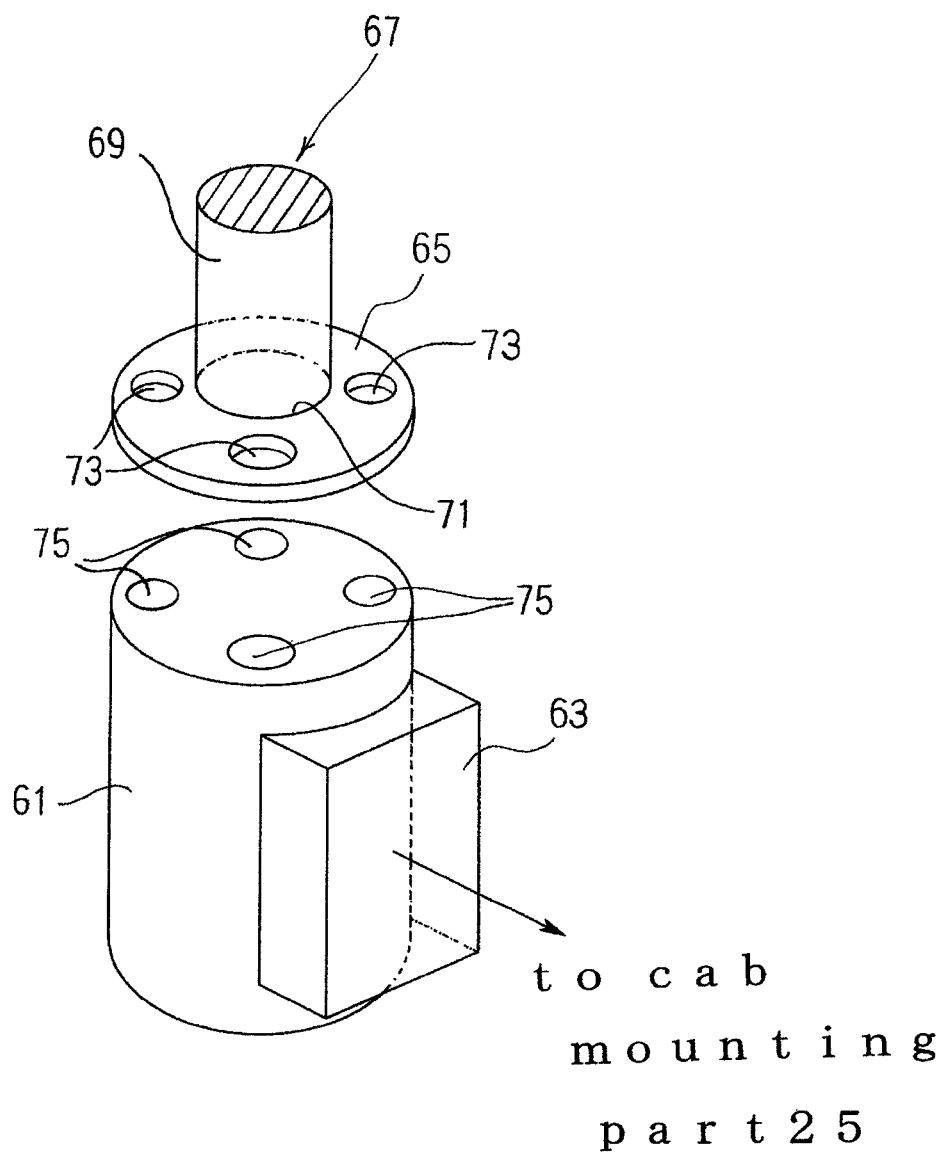
FIG. 9 is an entire perspective view of a gear box jig.

FIG. 7 to FIG. 9 illustrate another embodiment of the present invention, and in addition to the structure of the above-described crash test apparatus 11, a crash test apparatus of this embodiment is capable of reproducing a movement amount (displacement amount) of a steering column (a generic name of all of the steering wheel to the steering shaft) in a real vehicle crash test.

In FIG. 8, 61 denotes a gear box jig formed in a cylindrical shape imitating an outer shape of an actual gear box, and similarly to a gear box attached to a cab mounting part on a right front part of a cab of a real vehicle, the gear box jig 61 is fixed via a mounting bracket 63 to a cab mounting part 25 disposed on a right part of a fixture frame 13.

As illustrated in FIG. 9, on an upper part of the gear box jig 61, a steering shaft 69 of a steering column 67 is attached via a steering column mounting bracket 65. In the steering column mounting bracket 65, a shaft mounting hole 71 is formed at its center to have an insertion-side tip of the steering shaft 69 inserted therein, and around the shaft mounting hole 71, four bolt insertion holes 73 are formed at 90° intervals.

In the upper part of the gear box jig 61, four bolt mounting screw holes 75 corresponding to the bolt insertion holes 73 are provided, and by using these bolt insertion holes 73 and bolt mounting screw holes 75, the steering column mounting bracket 65 to whose shaft mounting hole 71 the steering shaft 69 is fitted is fixed to the upper part of the gear box jig 61 by screws, whereby the steering column 67 is fixed to the cab mounting part 25 as in a real vehicle.

A protruding barrier 17 is disposed at a lower position than that in the crash test apparatus 11 so that the protruding barrier 17 crashes against the gear box jig 61 at the time of a crash test, as illustrated in FIG. 7.

Incidentally, the crash test apparatus 11-1 according to this embodiment also has the crash structure 19, though not shown. Besides, in FIG. 7, 77 denotes a steering wheel, and as already described, the steering wheel 77 and the steering shaft 69 form the steering column 67.

Since the other structure is the same as that in the embodiment in FIG. 1, the same components will be denoted by the same reference numerals and symbols and a detailed description thereof will be omitted.

The crash test apparatus 11-1 according to this embodiment is thus structured, and the gear box jig 61 imitating an actual gear box is fixed to the cab mounting part 25 as in a real vehicle and the steering column 67 is attached to the gear box jig 61 as in a real vehicle, and therefore, according to this crash test apparatus 11-1 capable of reproducing a crash similar to that of a real vehicle, when the protruding barrier 17 crashes against the gear box jig 61 and the gear box jig 61 deforms, it is possible to simulate behaviors of the steering wheel 77 and the steering shaft 69 (steering column 67) at the time of the crash and to measure a damage value of a driver.

Therefore, according to this embodiment, similarly to the aforesaid embodiment, it is possible to attain the desired proposition, and not only the confirmation of cab strength, the verification and confirmation of the airbag sensor sensitivity, and so on but also the confirmation of a displacement amount of the steering column 67 is possible only with the cab C without conducting a crash test using a real vehicle, so that it is possible to reduce development expense of new-model vehicles owing to a reduction in the number of crashed real vehicles, shorten an evaluation period, and improve business efficiency.

When only the deformation amount of the steering column 67 is verified, the load-carrying platform jig 23 is not necessary, and when all of them including the deformation amount of the cab C and so on are evaluation targets as in the embodiment in FIG. 7, the crash test is conducted in a state where the load-carrying platform jig 23 is mounted.

Figure 10:
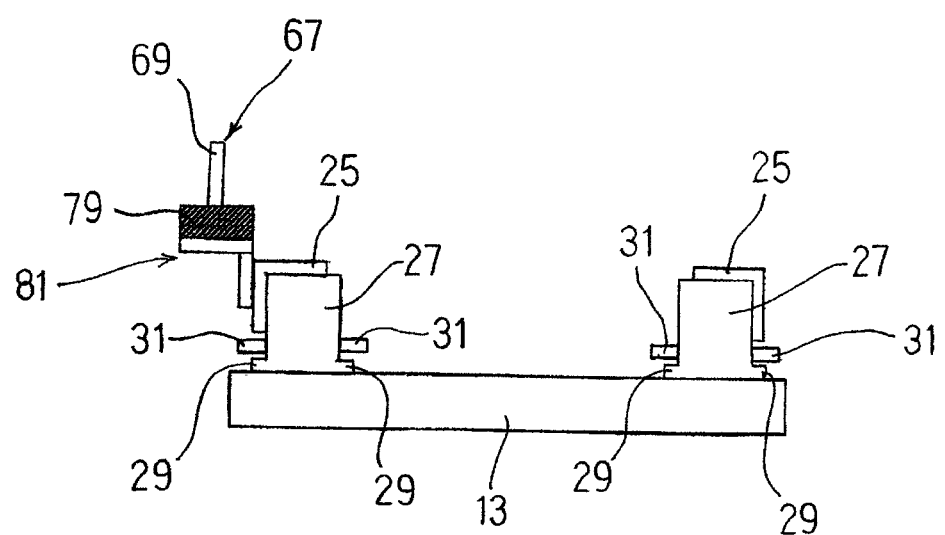
FIG. 10 is a front view of a fixture frame of a crash test apparatus according to a further embodiment of the present invention.
Figure 11:
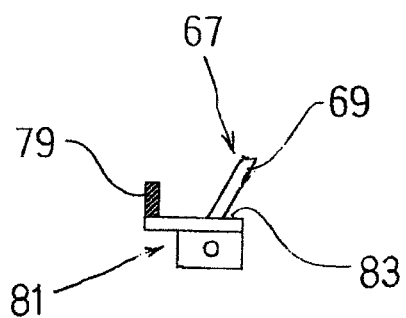
FIG. 11 is a side view of a steering column mounting bracket.
Figure 12:
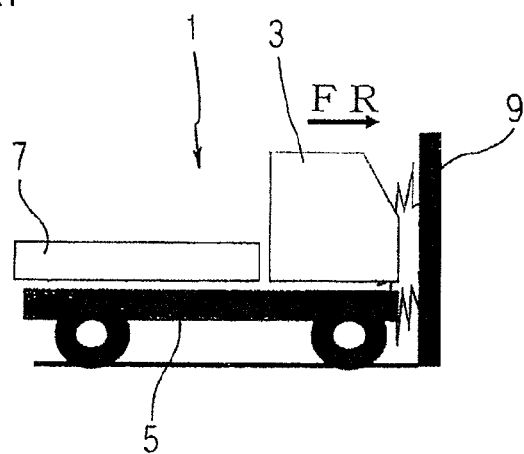
FIG. 12 is an explanatory view illustrating a conventional crash test method.

FIG. 10 and FIG. 11 illustrate yet another embodiment of the present invention, and in a crash test apparatus according to in this embodiment, instead of the gear box jig 61 and the mounting bracket 63, a steering column mounting bracket 81 with an L-shaped cross section on which a barrier bearing surface 79 facing the protruding barrier 17 is directly fixed to a cab mounting part 25, and a steering shaft 69 is mounted on a steering column mounting surface 83 of the steering column mounting bracket 81.

Since the other structure is the same as that of the embodiment in FIG. 1, the same components will be denoted by the same reference numerals and symbols and a description thereof will be omitted.

This embodiment is thus structured, and according to this embodiment, similarly to the aforesaid embodiments, it is also possible to attain the desired proposition, and when the steering column mounting bracket 81 deforms when the protruding barrier 17 crashes against the barrier bearing surface 79, it is possible to simulate behaviors of a steering wheel 77 and the steering shaft 69 (steering column 67) at the time of the crash and to measure a damage value of a driver.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to exact construction and operation illustrated and described, and accordingly all suitable modifications and equivalents may be resorted to, falling within the scope thereof.

The invention claimed is:

1. A crash test apparatus comprising:
    a fixture frame including a front support device supporting a front part of a cab so as to allow the front part to move in a front and a rear direction and a rear support device fixing and supporting a rear part of the cab;
    a cart mounting the fixture frame;
    a protruding barrier disposed in front of the cab;
    a crash device moving the cart to make the cab crash against the protruding barrier and
    a real vehicle frame deformation amount reproduction mechanism disposed between a front of the cart and the protruding barrier, and when the crash device operates to make the cab crash against the protruding barrier, the mechanism reproducing a crash deformation amount of a frame of a real vehicle on which the cab is mounted.

2. The crash test apparatus according to claim 1, wherein a load-carrying platform jig is mounted behind the cab on the fixture frame.

3. The crash test apparatus according to claim 1, wherein:
    the front part of the cab being supported by the front support device is a front cab mounting part disposed on a front lower part of the cab;
    a gear box jig imitating a steering gear box is attached to the front cab mounting part; and
    a steering column is attached to the gear box jig.

4. The crash test apparatus according to claim 1, wherein:
    the front part of the cab being supported by the front support device is a front cab mounting part disposed on a front lower part of the cab;
    a steering column mounting bracket is attached to the front cab mounting part; and
    a steering column is attached to the steering column mounting bracket.

5. A crash test apparatus comprising:
a fixture frame for mounting a cab to be crash tested, the fixture frame including a front support device on upper part of the fixture frame for supporting a front part of the cab so as to allow the front part to move in a front and rear direction of the fixture frame and a rear support device for fixing a rear part of the cab to the fixture frame to support the rear part;
a cart mounting the fixture frame;
a protruding barrier disposed so that when a cab is mounted on the fixture frame the cab can be crashed against the protruding barrier; and
a crash device moving the cart to make a cab mounted on the fixture frame crash against the protruding barrier.

6. The crash test apparatus according to claim 5, wherein the front support device includes a front cab mounting part which can be disposed on a front lower part of a cab mounting in the fixture frame;
a gear box jig imitating a steering gear box is attached to the front cab mounting part; and
a steering column is attached to the gear box jig.

7. The crash test apparatus according to claim 5, wherein the front support device includes a front cab mounting part which can be disposed on a front lower part of a cab mounting in the fixture frame;
a steering column mounting bracket is attached to the front cab mounting part; and
a steering column is attached to the steering column mounting bracket.

* * * * *